Figure 1:
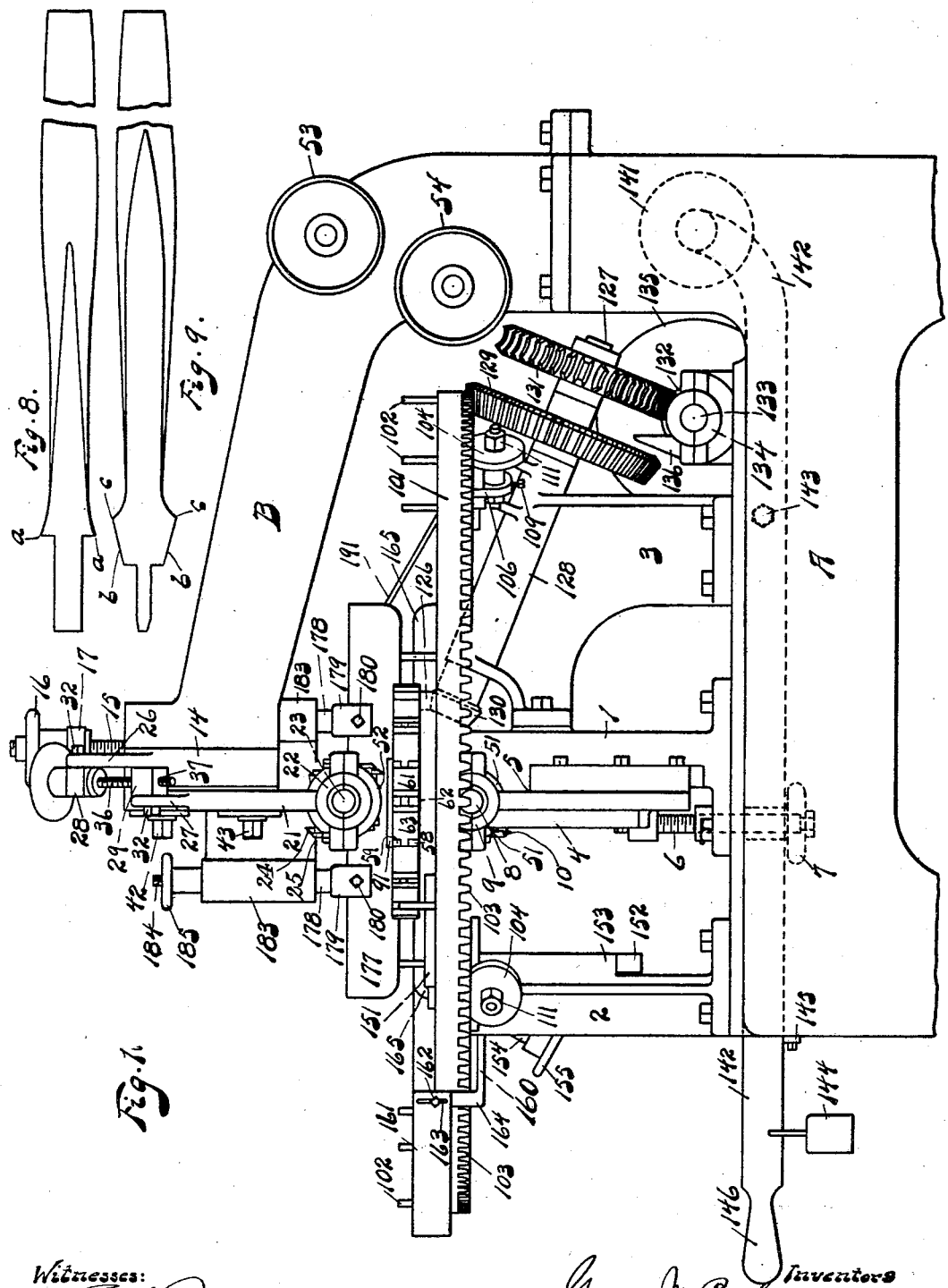

No. 677,174. Patented June 25, 1901.
G. W. BUGBEE & P. LESH.
SPOKE FACING MACHINE.
(Application filed Nov. 26, 1900.)
(No Model.) 4 Sheets—Sheet 1.

No. 677,174. Patented June 25, 1901.
G. W. BUGBEE & P. LESH.
SPOKE FACING MACHINE.
(Application filed Nov. 26, 1900.)
(No Model.) 4 Sheets—Sheet 2.

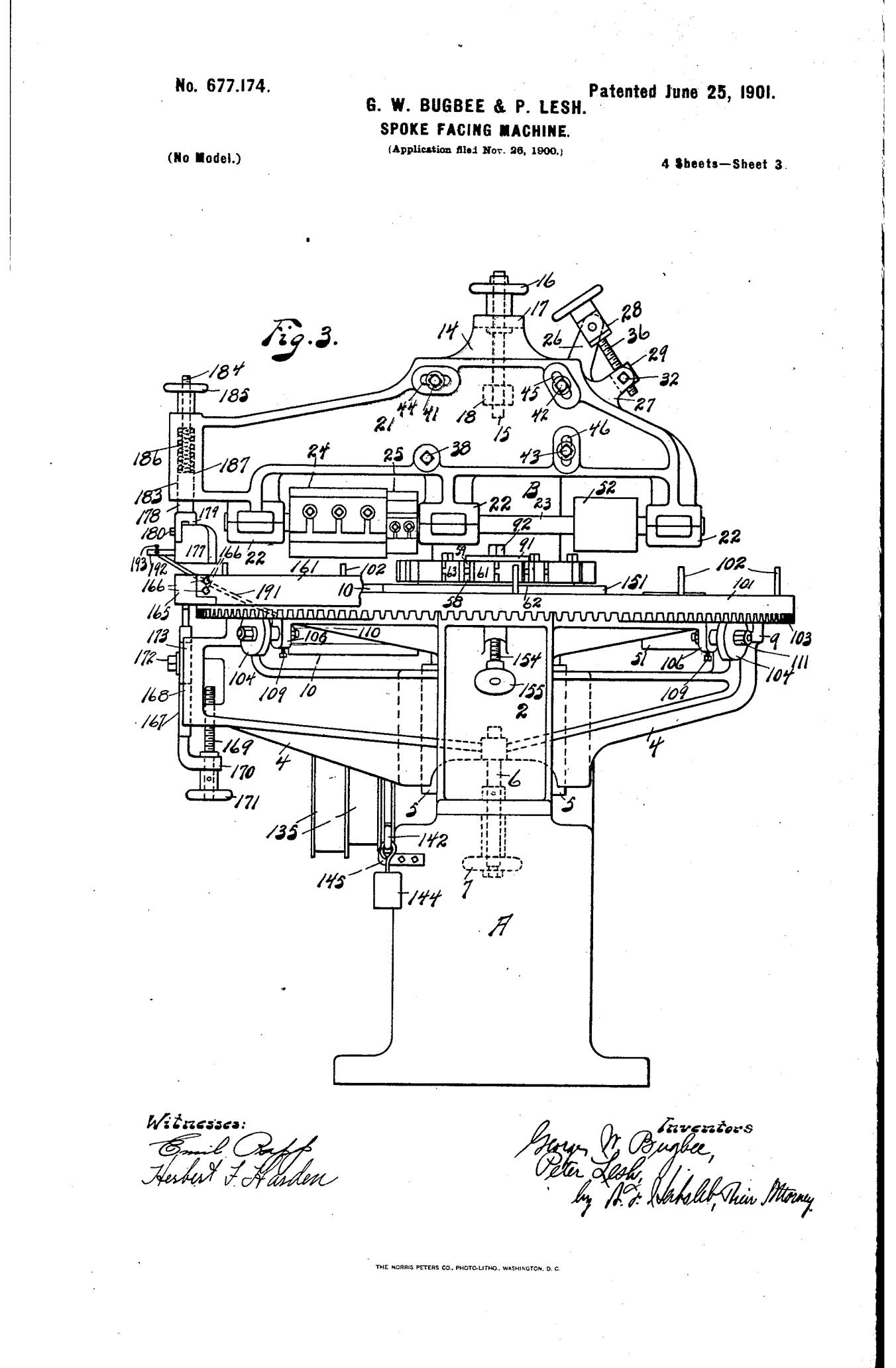

No. 677,174.  
G. W. BUGBEE & P. LESH.  
SPOKE FACING MACHINE.  
(Application filed Nov. 26, 1900.)  
Patented June 25, 1901.

(No Model.)  
4 Sheets—Sheet 3.

Fig. 3.

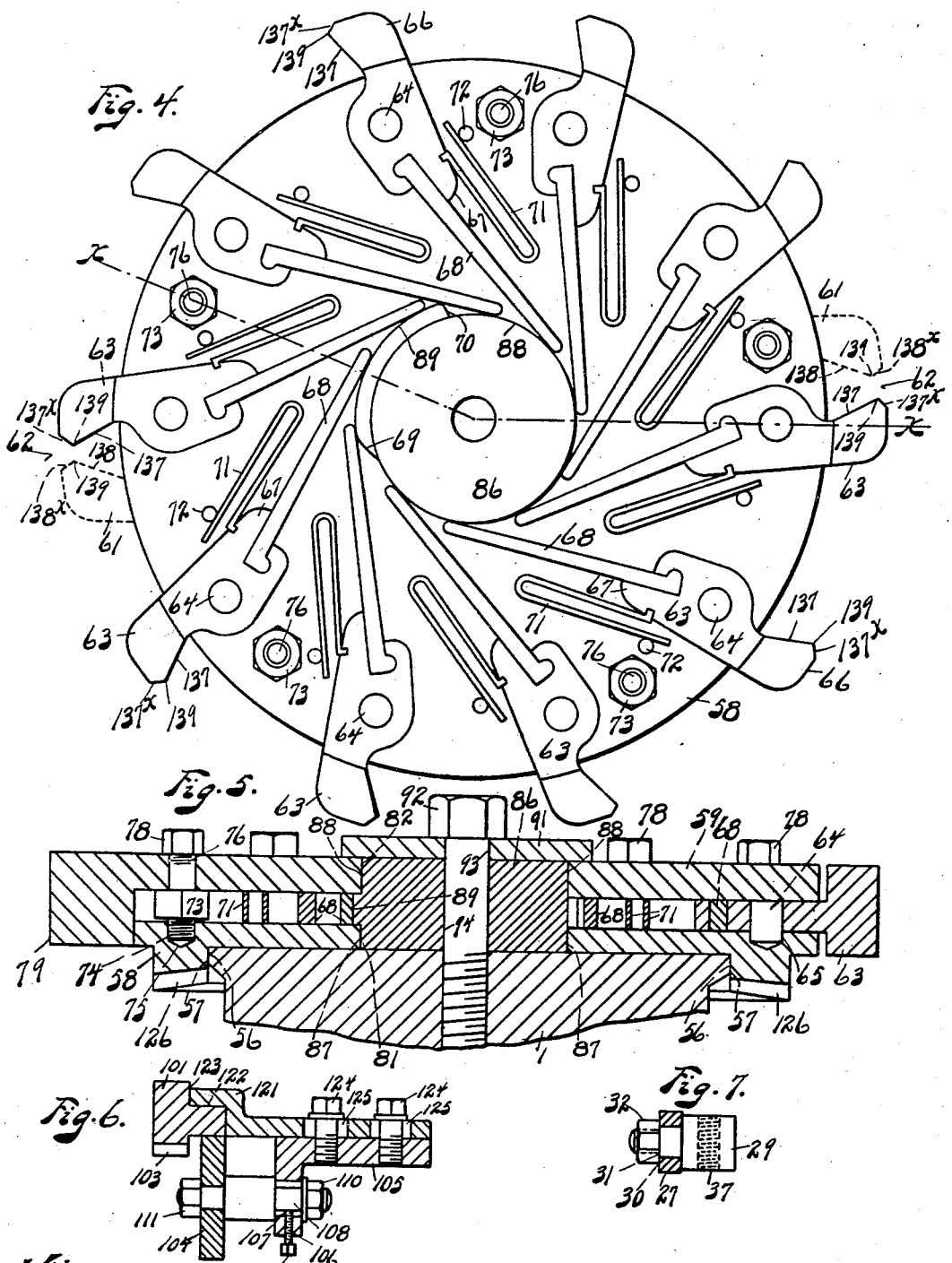

UNITED STATES PATENT OFFICE.

GEORGE W. BUGBEE, OF DELHI, OHIO, AND PETER LESH, OF JACKSON, TENNESSEE, ASSIGNORS TO J. A. FAY & EGAN COMPANY, OF CINCINNATI, OHIO.

SPOKE-FACING MACHINE.

SPECIFICATION forming part of Letters Patent No. 677,174, dated June 25, 1901.

Application filed November 26, 1900. Serial No. 37,773. (No model.)

*To all whom it may concern:*

Be it known that we, GEORGE W. BUGBEE, residing at Delhi, in the county of Hamilton and State of Ohio, and PETER LESH, residing at Jackson, in the county of Madison and State of Tennessee, citizens of the United States, have invented certain new and useful Improvements in Spoke-Facing Machines, of which the following is a specification.

Our invention relates to spoke-facing machines, and has for its object the providing of a machine having rotary feeding agencies by which the spoke may be automatically gripped and fed past the cutting agencies for facing both edges of the spoke at one passage of the same past the cutting agencies and automatically released in continuous and successive operation.

The invention consists in providing a rotary feeding device upon which the spoke may be placed, so as to be presented at an angle to its longitudinal axis to the cutting agencies; further, in so arranging the relation of the cutting and moving feeding devices that the angle of presentation of the spoke may be such that a shear cut may be taken to face the spoke, with either the outer or the inner end of the cut made first; further, in combining a rotary feeding device arranged to grip and carry the spoke past the cutting agencies with an overhanging arm for a cutting agency extending above from beyond the feeding agency and carrying a cutting agency for operating on the spoke; further, in providing such latter device with plates and gripping-jaws for the tenon end of the spoke and means for readily removing and interchanging the plates and jaws for different-sized spokes; further, in providing gripping-jaws and plates in a machine of the character described arranged to automatically grip and release the tenon of the spoke, with the tenon in upright position, in the adjustments for accommodating different thicknesses of tenon on spokes, in the peculiar form of jaws for allowing for feeding the spokes at an angle to either side of the radius of the feeding device, in the means for securing the feeding-jaws and plates for permitting their ready removal and interchange; further, in the peculiar mounting and mode of operation of the feeding device, and, further, in the parts and in the construction, arrangement, and combination of parts hereinafter more fully described and claimed.

Figure 2:
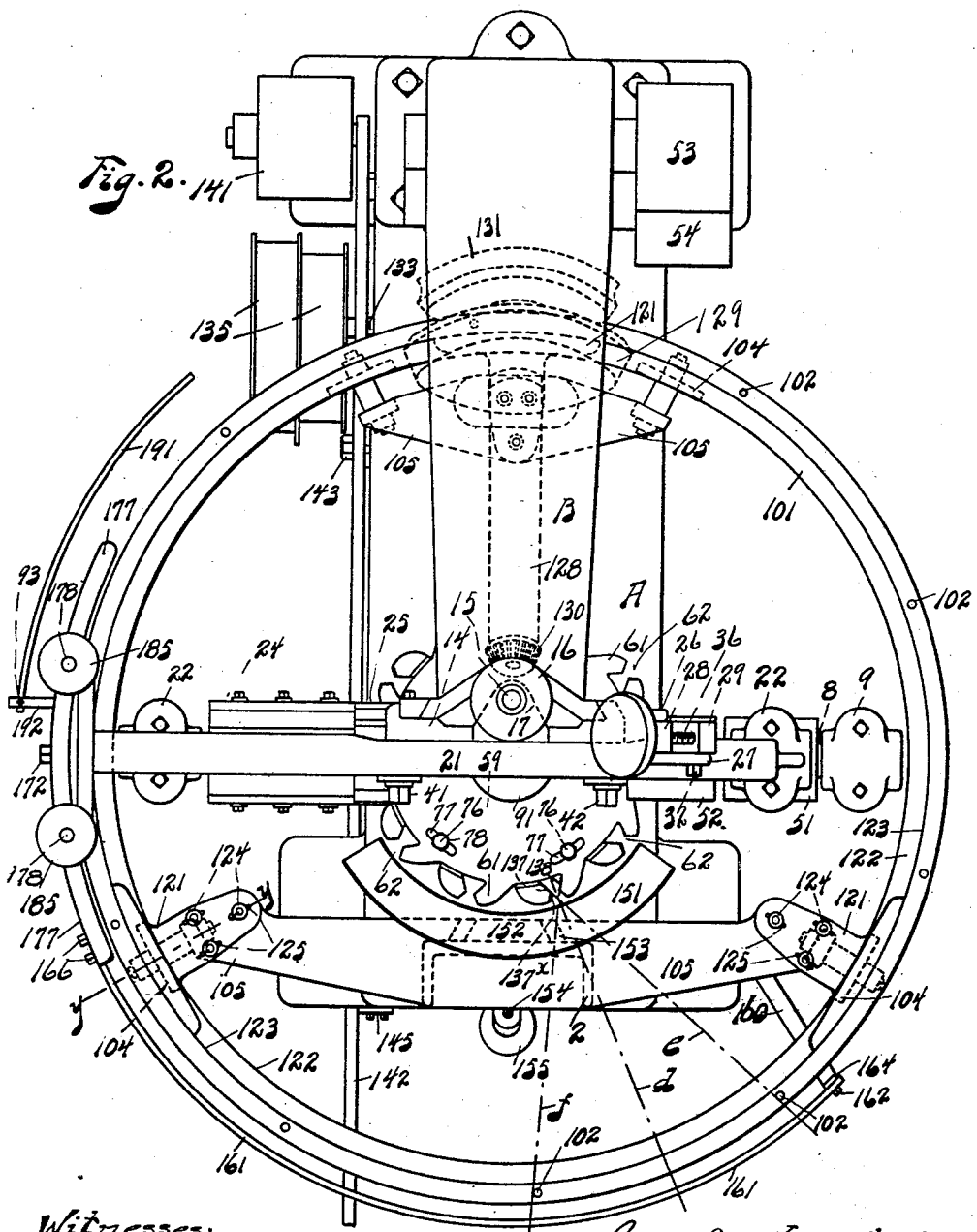

In the drawings, Figure 1 is a side elevation of my improved device with the lower part of the frame broken away. Fig. 2 is a plan view of my improved device, and Fig. 3 is a front elevation of the same. Fig. 4 is a plan view of the inner section of the feeding agency with the upper plate removed, but indicating in dotted lines two of the members of the clamping-jaws secured to the upper plate. Fig. 5 is a transverse section of the inner section of the feeding agency, taken on a line corresponding to the line $xx$ of Fig. 4. Fig. 6 is a detail in cross-section on the line $yy$, Fig. 2, showing the means for supporting the outer section of the feeding agency. Fig. 7 is a detail, partly in section, of the adjusting-stud for the upper cutter-head plate. Fig. 8 is a plan view of a wood-hub spoke, and Fig. 9 is a plan view of a "patent" spoke.

A represents the frame of the machine, and B an overhanging bracket or arm. The frame may have a central column 1 and uprights 2 3, which may form part thereof. A slide 4 is adjustable in ways 5 on the column by means of a screw-shaft 6, operated by a hand-wheel 7. The slide carries a shaft 8, journaled therein in bearings 9, a cutter-head 10 being mounted on the shaft for facing the lower edge of a spoke.

A slide 14 is adjustable on the arm or bracket B by means of a screw-shaft 15, operated by a hand-wheel 16. The shaft is collared to a lug 17 on the slide and is screw-threaded into a lug 18 on the bracket. The slide is preferably two-part, consisting of the slide proper and a plate 21, having bearings 22, in which a shaft 23 is journaled. A cutter-head 24 is secured to the shaft for facing the upper edge of a spoke. A second cutter-head 25 may, if desired, be also secured to the shaft next the cutter-head 24 to provide the upper outer end of the spoke with a slight beveled or rounded edge to admit of its ready insertion into the mortise in the hub when assembling the wheel. An adjustment between the slide proper and the plate is provided for permitting the cutter-head journaled in the plate to be set at a slight angle to the horizontal, if desired. For this purpose the slide proper and the plate are respectively provided with lugs 26 27, into which studs 28 29 take, respectively, through apertures 30, the ends of the studs being screw-threaded and having a shoulder 31, with a nut 32 taking about the screw-threaded end and against the shoulder, the parts being fitted to permit the studs to turn slightly in their apertures, while snugly fitting in other respects. An adjusting-screw 36 is collared to the stud 28, while taking into an internally-threaded aperture 37 in the stud 29. The plate is pivoted to the slide on a bolt 38, taking through an aperture in the plate into the slide, other bolts 41, 42, and 43 taking through slots 44, 45, and 46 in the plate into the slide. If it is desired to change the angle of cut, the bolts are loosened slightly, the adjusting-screw 36 turned until the cutter-head is at proper angle, and the bolts then drawn up to rigidly secure the plate and slide together.

The lower cutter-head shaft carries a suitable pulley 51 and the upper cutter-head shaft a suitable pulley 52 for driving the same, power being derived from a suitable counter-shaft suitably placed, a suitable belt passing direct from the counter-shaft to the lower cutter-head pulley and a suitable belt passing from the counter-shaft over idler-pulleys 53 54 for the upper cutter-head pulley.

The feeding agencies are preferably divided into two portions—an outer and an inner portion—which while relatively separated, so as to permit their movement past the cutting agencies without having intermediate interfering parts, are interconnected by means of their driving agencies, so as to move in unison.

The frame or column is provided with an annular engaging face 56, which engages an oppositely-arranged annular face 57 on a plate 58. A second plate 59 takes above the latter plate. Preferably the upper plate is provided with lugs or projections 61, which form one of the members of clamping-jaws 62 for the spokes. The other or movable member 63 of the jaws is pivoted on a stud or pin 64, taking into an aperture 65 in the lower plate. The pivotal point of the jaw is intermediate of its clamping end 66 and its heel 67. A bar or stiff spring-arm 68 extends rearwardly from the jaw 63, adapted to be cam-pressed for closing the jaws, as hereinafter explained. A spring 71 serves to normally open the jaws. It takes, preferably, between the heel of the jaw 63 and a pin 72, secured to the plate 58. The shanks of the jaws 63 take between the plates 58 and 59 and are preferably of uniform thickness where they take between the plates. Suitable washers 73, preferably provided with screw-threaded shanks 74, taking into threaded apertures 75 in the plate 58, are provided at suitable points near the periphery of the plates to serve as abutments between the plates and are in practice adjusted with their upper faces sufficiently above the face of the lower plate, so that when the upper plate is in position there will be just sufficient space between the inside faces of the plates to snugly accommodate the shanks of the jaws 63 between them, so as to allow the latter to readily swing on their pivots, while providing snugness of fit and preventing lost motion. The jaws radiate from the plates, and the pivoted jaw is energized from its inner end. The plates are secured firmly together by means of bolts 76, forming a part of the washers and extending therefrom, taking through slots 77 in the plate 59 and having nuts 78 taking over their upper ends. The slots serve the purpose of allowing the jaws of each pair to be adjusted to and from each other, as it will be readily seen that as one of the jaws of each pair is a part of the upper plate and the other jaw of each pair is pivoted to the lower plate a relative turning of the plates will cause a relative change in the distance between the jaws of each pair, thus accommodating spokes having different thicknesses of tenon in the manner hereinafter explained.

The jaws 61 extend outwardly from the plate 59 and depend therefrom, as shown at 79, to span the space between the plates 58 and 59, and extend below the upper face of the lower plate a distance to correspond to their extension above the lower face of the upper plate, so as to bring the middle of their vertical extension to about the middle of the distance between the plates. The outward end of the pivoted jaw 63 also extends upwardly and downwardly from its shank, so as to make the jaws of substantially equal width.

The plates, rigidly secured together by means of the bolts 76, as explained, turn about a center piece 86, having two concentric faces 87 88 and an eccentric face 89, the latter forming a cam-face protruding beyond the concentric faces in a position near the cutter-heads. The inner ends of the arms 68 are adapted to ride the protruding part of this cam for clamping the jaws. When they reach the gradually-rising part 69, the jaws gradually close on the spoke between them, the parts being relatively so placed and timed that when the spoke is being fed past the cutting agencies it will be firmly clamped, and when the shoulder 70 is reached the jaws are again opened by means of the springs 71.

In practice I find it desirable to assemble the plates and jaws as follows: The pivoted jaws are assembled with relation to the lower plate with their springs in position and the lower concentric part of the center piece placed in the central opening 81 in the lower plate, into which it fits snugly to make a journal connection. The upper plate is then put in place, with its central opening 82 taking about the upper concentric part of the center piece to also make a journal fit. The upper surface of the center piece and the upper surface of the upper plate will now be substantially flush, but with the upper surface of the center piece sufficiently above the upper surface of the upper plate, so that when a washer 91, which extends beyond the edge of the center piece above the plate, is secured in place a journal fit will be provided between the washer and plate. A bolt 92 takes through an aperture 93 in the washer and aperture 94 in the center piece and is screw-threaded into the column to hold the washer and center piece rigidly in position and permit the plates to turn about them. The plates have meanwhile been rigidly secured with relation to each other by the nuts 78.

The outer part of the feeding agency is preferably constructed as follows: A ring 101 is provided with abutments or pins 102, against which the spokes are adapted to take when being fed. The ring is provided with a circular rack 103 for turning the same. At suitable points the ring rides on idlers 104, of which I have shown four. Brackets 105 extend from the frame and are provided with lugs 106, having slots 107, in which studs 108 are adjusted, as by means of a set-bolt 109, being secured in place by means of nuts 110, the idlers rotating on the studs and held in place thereon by nuts 111. Shoes 121 take against annular faces 122 123 on the ring and center the ring with relation to its center of rotation and the center of rotation of the plates 58 59. The shoes are secured to the brackets 105 by means of bolts 124, taking through slots 125 into the brackets, giving them the desirable adjustment for centering the ring accurately. It will thus be seen that the ring is rotatable and held to its proper line of travel as effectively as if it were centered on a shaft.

The plate 58 is provided with a circular rack 126. A shaft 127 is journaled in a bearing 128 in the frame and carries gears 129 130, meshing, respectively, with the racks 103 and 126 on the outer ring and lower inner plate, respectively, the respective gears and racks being so arranged as to number of teeth and diameter that the rotation of the shaft 127 will rotate the plates and ring in unison. The shaft 127 is rotated by a worm-gear 131, meshing with a worm 132 on a shaft 133, journaled in bearings 134 in the frame. A pulley or pulleys 135 may be secured to the shaft and receive power from the counter-shaft hereinbefore mentioned. An idler-pulley 141 is provided for regulating the tension of the belt passing from the counter-shaft to the pulley 135. It is supported by a lever 142, pivoted to the frame as at 143, and is provided with a weight 144 to normally tighten the belt. A rest 145 is provided at the frame upon which the lever may be placed when it is desired to arrest the feed. The lever may have a grip 146.

An oil-reservoir 136 may be provided for the worm.

Spokes are mainly of two general classes, what are known as "wood-hub" spokes and "patent" spokes. The former are of the general type shown in Fig. 8. They have shoulders at the end of the tenon which take directly against the periphery of the hub, with the throat extending to the shoulder, thereby forming a small point or corner $a$, which is very liable to break in facing the spoke. In the patent type of spoke the two sides of the spoke are beveled for a short distance outwardly from the shoulder of the tenon, forming a bevel or wedge, as shown more clearly at $b$ in Fig. 9, and from the head of the bevel the body of the spoke recedes toward its axis to form the throat of the spoke, leaving a point or corner $c$ between the bevel and throat, which is also very liable to be broken away in facing the spoke. We have found it desirable to cut the two classes of spokes, respectively, with the points or corners mentioned presented to the cutting agencies in such manner that the greatest body of the same will be operated on by the cutter-heads last in facing that part of the spoke, and we accomplish this to a nicety and in an economical way by supporting one class of spoke on the rotating feeding agency at an angle to one side of the radius of the feeding agency and the other class of spoke at an angle to the other side of the radius of the feeding agency.

In Fig. 2 we have designated the radius by the dotted line $d$, the line of the position for the wood-hub spoke by the letter $e$, and the line of the position for the patent spoke by the dotted line $f$. It will be seen that by this arrangement the wood-hub spoke will be fed to the cutters with its inner end first and the patent type of spoke with its inner end last. To accomplish this in an easy and economical manner, we provide the clamping-jaws with peculiarly-shaped clamping-faces. The inner ends of the opposite clamping-faces of the respective jaws are preferably respectively shaped to extend in planes corresponding substantially to the planes occupied by the spoke when clamped, as shown at 137 and 138, the face 137 being provided for the wood-hub spokes and the face 138 for the patent spokes. Each pair of jaws, therefore, has two clamping-faces, one for a spoke extending at an angle to one side of the radius of the feeding agency and the other for a spoke extending at an angle to the other side of the radius of the feeding agency, although the spoke may find support against the jaw at any suitable point. The outer ends of the jaws recede, as at $137^\times$ and $138^\times$, for the purpose of clearance, leaving an apex 139, with the two faces of each jaw extending in planes to bisect each other. The apexes are substantially opposite each other when the spoke is clamped. A wood-hub spoke will in being clamped take between a pair of jaws and against an abutment on the outer rim in rear of the jaws, and a patent spoke taking between the same jaws would take against an abutment in advance of the same. The radii of the jaws and abutments preferably alternate. It will be thus seen that the spokes are given a shear cut, the shear being in one direction in one class of spokes and in the other direction in the other class of spokes. We prefer to have the cutter-heads extend longitudinally coincident with the radius of the feeding agency and to get the shear cut by feeding the spokes to the cutter-heads on the feeding agency while supported thereby at an angle to that radius. The spokes may, if desired, be fed in a position coincident with the radius of the feeding agency, with the cutter-heads extending longitudinally at an angle to that radius; but the adjustments for change of angle of cut would in that construction be more complicated and costly, and we prefer the construction shown.

In feeding spokes to the machine the spoke is placed on a support or table 151, which is adjustable to height for centering the spoke, and thereby dividing the cut. The table is mounted on a slide 152, sliding in ways 153 in the frame, an adjusting-screw 154, having a hand-wheel 155, being screw-threaded with relation to the frame and having its upper end taking against the under side of the table and adapted to raise and lower the table with relation to the clamping-jaws and plates. The support is preferably shaped on the arc of a circle and comparatively narrow. In feeding the spoke the tenon thereof is placed in upright position between the jaws of a pair, the spoke being allowed to rest on the support slightly beyond its throat position. A second rest 161 for the spoke, nearer its felly end, is also provided. This rest is also preferably shaped on the arc of a circle and is also adjustable to height for centering the spoke, and thereby dividing the cut. At one end it is adjustable and secured with relation to the frame by means of a bolt 162, taking through a slot 163 in the rest and into a lug 164, projecting from a bracket 160. At its other end it is secured to an adjustable pressure-plate, hereinafter described. In placing the spoke it is allowed to rest on the supports 151 161, which gage its position with relation to the jaws and the line of the cut. The end of the outer rest near the cutter-heads is secured to a pressure-plate 165 in any suitable manner, as by means of bolts 166. This pressure-plate is mounted on the lower cutter-head slide on a slide 167, sliding in ways 168 and adjustable by means of an adjustable screw 169, collared to a lug 170 and threaded into the cutter-head slide. A hand-wheel 171 is also provided. A set-screw 172, taking through a slot 173 in the slide 167 and into the lower cutter-head slide, holds the pressure-plate firmly in place. A pressure-bar 177 is also provided and may be adjusted to position and tension in any suitable manner, as by being secured to upright slides 178, the lower ends of the slides being forked, as shown at 179, to take about the bar, to which they are secured by bolts 180. There may be a plurality of the slides—preferably two—and they may slide in sockets 183 in the plate for the upper cutter-head, the upper ends of the slides being preferably screw-threaded, as shown at 184, to receive an adjusting-nut 185. A spring 186 may be interposed between the end of the socket and a shoulder 187 on the slide to give the pressure-bar proper tension.

In practice spokes vary in diameter and in thickness of tenon. To accommodate for various sizes of spokes, therefore, we provide the adjustment between the jaws to accommodate different thicknesses of tenon, which is accomplished by the loosening of the nuts 78, the movement of the plates relatively to each other to get the respective jaws of the pairs the proper distance apart, and the fastening of the nuts which fasten the plates and jaws in their new position. If it is desired to use the spokes of a size beyond the range of the plates then in the machine, other plates having jaws of greater width may be provided. The plates are all preferably of the same diameter, the jaws, however, being of greater width. We find that two sets of plates and jaws will suffice—one for the smaller and another for the larger spokes. In order to conveniently change from one set of inner clamping devices to the other, we provide a bracket B for supporting the upper cutting agency, so as to have clearance for permitting the ready removal and placing of the inner clamping agencies. If it is desired to change the inner clamping agency, it is only necessary to remove the bolt 92, when the plates and jaws, with their center piece, may be lifted bodily and in assembled form out of the machine and the inner clamping agency it is desired to use put in its place, also in assembled form, with its jaws, plates, and center piece fastened together as a composite whole. The interchange is very readily and quickly made. The new inner clamping device will fit upon the upper end of the column and its rack will fit readily into the gear, a proper mark being made on the rack and gear to insure their proper assembling.

In operation, the clamping-jaws are set the proper distance apart to properly and firmly clamp the tenon of the spoke. The inner and outer spoke supports, the cutter-heads, and the pressure-bar and the pressure-plate are adjusted to proper height with relation to each other and the position of the inner feeding and clamping device to properly position the spoke and the cutting agencies with reference to the spoke. If in facing the spoke it is desired to give one face a slight slant or taper, the upper cutter-head is set at a slight angle to the horizontal, in the manner hereinbefore explained. The spoke is now placed upon its supports and its tenon introduced in upright position between the clamping-jaws. The clamping-jaws are sufficiently wide to firmly hold the spoke properly with its tenon in upright position and still allow the tenon to project slightly beyond the jaws at top and bottom for the cutter-heads to take the proper cut, and the spoke is held and guided to the cutter-heads with the tenon maintained in perpendicular position, so that the facing-cut of the cutter-heads is always at true right angles to the tenon, so that when the spokes are assembled in the wheel the faces of neighboring spokes will be in the same plane and present a smooth and unbroken surface, assuming, of course, that the mortises have been properly made. As the feeding device turns during the first part of the advance of the spoke toward the cutter-heads the rear arm of the movable jaws will ride free of the cam of the center piece, keeping the jaws open with the tenon end of the spoke between the jaws and the shank of the spoke resting against the abutment or pin on the outer ring of the feeding device. As the inner end of the rear arm of the movable clamping-jaw climbs upon the cam the jaw closes toward its mate, holding the tenon of the spoke firmly between the jaws. The spoke will now have advanced to the pressure-bar, which takes against it and aids in holding it in true and firm position while being acted upon by the cutter-heads, which face both edges of the spoke simultaneously with a shear cut to prevent tearing of the corners in the manner hereinbefore explained. In the meantime other spokes have been fed into the machine, and the operation is repeated in continuous and rapid succession, the capacity of the machine being very great and the work of a high degree of excellence. The angle of presentation of the spoke to the cutting agency may be changed and a greater shear obtained in the cut by changing the relative positions of the inner and outer feeding device—as, for instance, by advancing the teeth on the rack with relation to the gear. After the spoke has passed the cutting agencies the rear end of the arm of the movable jaw leaves the cam, thereby forcing the jaws open and releasing the spoke. Preferably a spring-arm 191 projects from a post 192, to which it is secured by a bolt 193. The post is secured to the pressure-bar. The arm 191 extends rearwardly and downwardly and presses downwardly upon the outer end of the spoke, lifting its inner end and flopping it away from the feeding agency and machine to automatically remove the spoke after it is operated upon.

We claim—

1. In a spoke-facing machine, the combination of a cutting agency, a rotary feeding device, and means constructed and arranged for severally clamping the tenon of a spoke with its edge toward the cutting agency and for presenting the edge of a spoke and its tenon to the cutting agency at an angle to the radius of the feeding agency for giving the corner at the end of the throat portion of the spoke a shear cut, substantially as described.

2. In a spoke-facing machine, the combination of a cutting agency, and a rotary feeding device and means for clamping the tenon of a spoke in upright position, and presenting a spoke to the cutting agency at an angle to the radius of the feeding agency, for facing the edge of a spoke and tenon, including the outer corner at the end of the throat portion, with a shear cut, at one passage of the spoke past the cutting agency, substantially as described.

3. In a spoke-facing machine, the combination of a rotary feeding agency provided with means for clamping the tenons of spokes in upright position, and cutting agencies for facing both edges of the spoke and tenon, substantially as described.

4. In a spoke-facing machine, the combination of a cutting agency, a feeding device, jaws for severally clamping the tenon of a spoke with its edge toward the cutting agency, and an abutment for the spoke, constructed and arranged for presenting the edge of a spoke and its tenon to the cutting agency at an angle to the longitudinal plane of the cutting agency for giving the corner at the end of the throat portion of the spoke a shear cut, substantially as described.

5. In a spoke-facing machine, the combination of a feeding agency for passing a spoke past a cutting agency provided with means for severally holding the tenons of spokes with their edges toward the cutting agency and constructed and arranged for presenting the edge of the spoke and of its tenon to a cutting agency for facing both of the same at one passage of a spoke past a cutting agency, substantially as described.

6. In a spoke-facing machine, the combination of a feeding agency for passing a spoke past a cutting agency and provided with means for holding the tenons of spokes in upright position for facing the edge of both spoke and tenon while feeding the spoke past a cutting agency.

7. In a spoke-facing machine, the combination of a cutting agency, a rotary feeding device, jaws and an abutment therefor arranged for presenting a spoke to the cutting agency at an angle to the longitudinal plane of the cutting agency, substantially as described.

8. In a spoke-facing machine, the combination of a cutting agency, a rotary feeding device, jaws and an abutment therefor arranged for presenting a spoke to the cutting agency at an angle to the longitudinal plane of the cutting agency, and an overhanging arm extending above from beyond the feeding agency, with a cutting agency therefor, substantially as described.

9. In a spoke-facing machine, the combination of a feeding device comprising a pair of plates, and jaws having one member secured with relation to one of the plates and the other member secured with relation to the other plate, with means for adjusting a plate about its axis, substantially as described.

10. In a spoke-facing machine, the combination of a feeding device comprising a pair of plates, and jaws having one member secured with relation to one of the plates and the other member secured with relation to the other plate, with means for permitting the adjustment of a plate about its axis for varying the distance between the respective members of clamping-jaws, and means for securing the plates in adjusted position, substantially as described.

11. In a spoke-facing machine, the combination of a feeding agency comprising a rotatable feeding device having an inner and an outer section, with clamping-jaws for the inner section and abutments for the outer section rotating with the feeding device, means for adjusting the distance between the respective members of the jaws about the axis of the feeding device, substantially as described.

12. In a spoke-facing machine, the combination of a feeding agency comprising a rotatable feeding device having an inner and an outer section, with clamping-jaws for the inner section and abutments for the outer section, rotating with the feeding device, means for adjusting the distance between the respective members of the jaws about the axis of the feeding device, with means for automatically closing and opening the jaws, substantially as described.

13. In a spoke-facing machine, the combination of a feeding agency comprising a rotatable feeding device having an inner and an outer section, with clamping-jaws for the inner section and abutments for the outer section, rotating with the feeding device, means for adjusting the distance between the respective members of the jaws about the axis of the feeding agency, and a circular rack for the inner and a circular rack for the outer section, with a common shaft and gears for rotating the sections in unison, substantially as described.

14. In a spoke-facing machine, the combination of a feeding agency comprising a rotatable feeding device having an inner and an outer section, with clamping-jaws for the inner section and abutments for the outer section rotating with the feeding device, means for adjusting the distance between the respective members of the jaws about the axis of the feeding agency, and a circular rack for the inner and a circular rack for the outer section, with a common shaft, and gears on the shaft for rotating the sections in unison, with an overhanging bracket and a cutting agency therefor, substantially as described.

15. In a spoke-facing machine, the combination of a pair of cutting agencies, a rotary feeding device and means for clamping the tenon of a spoke in upright position and feeding the spoke between the cutting agencies at an angle to the radius of the feeding agency, and a means for adjusting a cutting agency to an angle to the horizontal, substantially as described.

16. In a spoke-facing machine, the combination of a frame, lower cutter-head adjustable with relation thereto, an outside overhanging bracket, an upper cutter-head adjustable thereon, with a rotatable feeding agency interposed between the frame and bracket, substantially as described.

17. In a spoke-facing machine, the combination of a frame, a lower cutter-head therefor, an inner feeding agency, an outside overhanging bracket extending over the latter, an upper cutter-head therefor, with the inner feeding agency interposed between the frame and bracket, and a clearance between the frame and bracket for permitting the inner feeding agency to be removed, with an outer feeding agency acting in connection with the inner feeding agency for feeding the spokes, substantially as described.

18. In a spoke-facing machine, the combination of a frame, a lower cutter-head therefor, an inner rotatable feeding agency, with clamping-jaws radiating from and rotating with the inner feeding agency, an outside overhanging bracket extending above the inner feeding agency, an upper cutter-head therefor, with the inner feeding agency interposed between the frame and bracket, and a pressure agency adjustable with and independently of the upper cutter-head, and an outer rotatable feeding agency, substantially as described.

19. In a spoke-facing machine, the combination of a frame, a slide, a cutter-head therefor, an inner rotatable feeding agency, an outside overhanging bracket extending above the latter, a slide therefor, a cutter-head for the slide, an outer rotatable feeding agency, with means for rotating the feeding agencies in unison, and means for permitting the removal of the inner feeding agency without removing the bracket, substantially as described.

20. In a spoke-facing machine, the combination of a frame, a slide therefor, a cutter-head for the slide, a bracket, a slide therefor, a plate for the slide, a cutter-head journaled on the plate, with means for adjusting the plate on the slide, and a rotatable feeding device between the frame and bracket, having radiating jaws for clamping the tenons of spokes, substantially as described.

21. In a spoke-facing machine, the combination of a frame, with a slide therefor, and a cutter-head for the slide, a feeding agency, an outside overhanging bracket extending thereabove, a slide therefor, a plate for the slide, and a cutter-head journaled on the plate, with means for adjusting the plate on the slide, with a pressure-bar for the plate, and means for adjusting the pressure-bar, substantially as described.

22. In a spoke-facing machine, the combination of a frame, a slide therefor, and a cutter-head for the slide, with means for adjusting the slide, a rotatable feeding device comprising an inner and an outer section, with means for rotating the sections in unison, clamping-jaws for the inner section for clamping the tenons of spokes in upright position, and a spoke-supporting table between the inner and the outer sections, means for adjusting the table, and an overhanging bracket extending above the feeding agency, with an upper cutter-head for the bracket, substantially as described.

23. In a spoke-facing machine, the combination of a frame, a slide therefor, and a cutter-head for the slide, with means for adjusting the slide, a rotatable feeding device comprising an inner and an outer section, with means for rotating the sections in unison, clamping-jaws for the inner section for clamping the tenons of spokes in upright position, and a spoke-supporting table between the inner and the outer sections, means for adjusting the table, and an overhanging bracket extending above the feeding agency, with an upper cutter-head for the bracket, and a pressure-bar, substantially as described.

24. In a spoke-facing machine, the combination of a frame, a slide therefor, and a cutter-head for the slide, with means for adjusting the slide, a rotatable feeding device comprising an inner and an outer section, with means for rotating the sections in unison, clamping-jaws for the inner section for clamping the tenons of spokes in upright position, and a spoke-supporting table between the inner and the outer sections, means for adjusting the table, and an overhanging bracket extending above the feeding agency, with an upper cutter-head for the bracket, a spoke-support for the shanks of the spokes, and a pressure-bar above the support, substantially as described.

25. In a spoke-facing machine, the combination of a frame, a slide therefor, and a cutter-head for the slide, a rotatable feeding device comprising an inner and an outer section, with means for rotating the sections in unison, clamping-jaws for the inner section for clamping the tenons of spokes in upright position, a spoke-supporting table between the inner and the outer sections, means for adjusting the table, and an overhanging bracket extending above the feeding agency, with an upper cutter-head for the bracket, and a spoke-support for the shanks of the spokes, means for adjusting the support, a pressure-bar, and means for adjusting the latter, substantially as described.

26. In a spoke-facing machine, the combination of a frame, a slide therefor, and a cutter-head for the slide, a rotatable feeding device comprising an inner and an outer section, with means for rotating the sections in unison, clamping-jaws for the inner section for clamping the tenons of spokes in upright position, a spoke-supporting table between the inner and the outer sections, means for adjusting the table, and an overhanging bracket extending above the feeding agency, with an upper cutter-head for the bracket, and an arm for depressing the outer end of the spoke after the cut of the cutter-heads, substantially as described.

27. In a spoke-facing machine, the combination of a frame, a slide therefor, and a cutter-head for the slide, a rotatable feeding device comprising an inner and an outer section, with means for rotating the sections in unison, clamping-jaws for the inner section for clamping the tenons of spokes in upright position, a spoke-supporting table between the inner and the outer sections, means for adjusting the table, and an overhanging bracket extending above the feeding agency, an upper cutter-head for the bracket, with an incline for raising the shanks of the spokes above the abutments of the outer section of the feeding agency, substantially as described.

28. In a spoke-facing machine, the combination of a frame, a slide therefor, and a cutter-head for the slide, a rotatable feeding device comprising an inner and an outer section, with means for rotating the sections in unison, clamping-jaws for the inner section for clamping the tenons of spokes in upright position, a spoke-supporting table between the inner and the outer sections, means for adjusting the table, and an overhanging bracket extending above the feeding agency, with an upper cutter-head for the bracket, an arm for depressing the outer end of the spoke and an incline for raising the spoke above and beyond the abutments of the outer section of the feeding agency, substantially as described.

29. In a spoke-facing machine, the combination of an inner feeding agency comprising a pair of plates, means for rotating the plates, clamping-jaws extending sidewardly therefrom in the plane of extension of the plates, with means for automatically opening and closing the jaws in the direction of the plane of extension of the plates while the plates are rotating, with an outer feeding agency, substantially as described.

30. In a spoke-facing machine, the combination of an inner feeding agency comprising a pair of plates, with members of clamping-jaws extending between the plates, means for clamping the plates together, means for rotating plates in unison, and means for automatically opening and closing the jaws while the plates are rotating, with an outer feeding agency, substantially as described.

31. In a spoke-facing machine, the combination of an inner clamping agency comprising a pair of plates, members of clamping-jaws extending in the direction of the plane of extension of the plates and pivoted with relation to a plate, with means for automatically swinging the members on their pivots in the direction of the plane of extension of the plates while rotating with the plate, with an outer feeding agency, substantially as described.

32. In a spoke-facing machine, the combination of an inner clamping agency comprising a pair of plates and a center piece about which the plates rotate, members of clamping-jaws extending in the direction of the plane of extension of the plates and pivoted to a plate, with means for automatically swinging the members upon their pivots in the direction of the plane of extension of the plates while the plates rotate, with an outer feeding agency, substantially as described.

33. In a spoke-facing machine, the combination of a feeding device having an inner section comprising a pair of plates and a center piece about which the plates rotate, members of clamping-jaws pivoted between the plates, means for adjusting the distance between the plates, and means for securing the plates together, with an outer section for the feeding device, substantially as described.

34. In a spoke-facing machine, the combination of a feeding device having an inner section comprising a pair of plates and a center piece about which the plates rotate, members of clamping-jaws pivoted between the plates, means for adjusting the distance between the plates, means for securing the plates together, and means for adjusting the relative position of the plates about their axis, for regulating the distance between the members of clamping-jaws, with an outer section for the feeding device, substantially as described.

35. In a spoke-facing machine, the combination of a feeding device comprising a pair of plates, movable members of clamping-jaws pivoted between the plates, opposing members for the movable members of the clamping-jaws, and a center piece comprised of two concentric and an eccentric portion, with the plates arranged to rotate about the concentric portions and the movable members of clamping-jaws to be swung on their pivots by the eccentric portion, substantially as described.

36. In a spoke-facing machine, the combination of a feeding device comprising a pair of plates, movable members of clamping-jaws pivoted between the plates, opposing members for the movable members of the clamping-jaws, and a center piece comprised of two concentric and an eccentric portion between the latter, with the plates arranged to rotate about the concentric portions and the movable members of clamping-jaws to be swung on their pivots by the eccentric portion, with means for adjusting the distance between the plates, substantially as described.

37. In a spoke-facing machine, the combination of a feeding device comprising a pair of plates, movable members of clamping-jaws pivoted between the plates, opposing members for the movable members of the clamping-jaws, and a center piece comprised of two concentric and an eccentric portion between the latter, with the plates arranged to rotate about the concentric portions and the movable members of clamping-jaws to be swung on their pivots by the eccentric portion, with means for permitting the adjustment of the relative position of the plates, and means for securing the plates together, substantially as described.

38. In a spoke-facing machine, the combination of a feeding device comprising a pair of plates, movable members of clamping-jaws pivoted between the plates, opposing members for the movable members of the clamping-jaws, and a center piece comprising two concentric and an eccentric portion between the latter, with the plates arranged to rotate about the concentric portion and the movable members of the clamping-jaws to be swung on their pivots by the eccentric portion, a support upon which the plates rotate, with means for securing the center piece rigidly with relation to the support, substantially as described.

39. In a spoke-facing machine, the combination of an inner section of a feeding device comprising a pair of plates and a center piece about which the plates rotate, with two outer concentric and an inner eccentric portion for the center piece, movable members of clamping-jaws pivoted between the plates arranged to be swung on their pivots by contact with the eccentric portion of the center piece, opposing members for the movable members of the clamping-jaws, and means for rigidly securing the plates together, with an outer section of a feeding agency, substantially as described.

40. In a spoke-facing machine, the combination of an inner section of a feeding device comprising a pair of plates and a center piece about which the plates rotate, with two outer concentric and an inner eccentric portion for the center piece, movable members of clamping-jaws pivoted between the plates arranged to be swung on their pivots by contact with the eccentric portion of the center piece, opposing members for the movable members of the clamping-jaws, and means for rigidly securing the plates together, with means for adjusting the relative position of the plates about their axis, with an outer section of a feeding agency, substantially as described.

41. In a spoke-facing machine, the combination of an inner section of a feeding device comprising a pair of plates, with one of a series of members of clamping-jaws secured with relation to a plate and the other of said series pivoted with relation to the other plate, and an eccentric between the planes of the plates for causing the latter members of the jaws to swing about their pivots while the plates are rotating, and an outer section of a feeding device, substantially as described.

42. In a spoke-facing machine, the combination of a cutting agency, an inner section of a feeding agency comprising clamping-jaws having clamping-faces extending in planes at angles to both sides of a radius of the feeding agency, an outer section of a feeding agency, with abutments therefor, and constructed and arranged substantially as described.

43. In a spoke-facing machine, the combination of a cutting agency, an inner section of a feeding agency comprising clamping-jaws each having clamping-faces extending in planes bisecting each other and a radius of the feeding agency, an outer section of a feeding agency, with abutments therefor, and constructed and arranged substantially as described.

In testimony whereof we have signed our names hereto in the presence of two subscribing witnesses.

GEORGE W. BUGBEE.
PETER LESH.

Witnesses:
G. H. MILES,
PARKE S. JOHNSON.